United States Patent
Fujii et al.

(10) Patent No.: US 10,166,886 B2
(45) Date of Patent: Jan. 1, 2019

(54) OCCUPANT DETECTION METHOD AND OCCUPANT DETECTION APPARATUS

(71) Applicant: AISIN SEIKI KABUSHIKI KAISHA, Kariya-shi (JP)

(72) Inventors: Hiroyuki Fujii, Kariya (JP); Isao Honda, Chiryu (JP); Takahiro Izuno, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 261 days.

(21) Appl. No.: 15/298,575

(22) Filed: Oct. 20, 2016

(65) Prior Publication Data
US 2017/0113573 A1    Apr. 27, 2017

(30) Foreign Application Priority Data
Oct. 27, 2015 (JP) ................................. 2015-211183

(51) Int. Cl.
| | |
|---|---|
| *B60N 2/90* | (2018.01) |
| *B60R 21/015* | (2006.01) |
| *G01G 19/414* | (2006.01) |
| *B60N 2/00* | (2006.01) |
| *B60N 2/64* | (2006.01) |

(Continued)

(52) U.S. Cl.
CPC .............. *B60N 2/002* (2013.01); *B60N 2/64* (2013.01); *B60N 2/72* (2013.01); *B60N 2/80* (2018.02); *G01G 19/414* (2013.01); *G01G 19/4142* (2013.01); *B60R 21/01516* (2014.10)

(58) Field of Classification Search
CPC . B60N 2/002; B60N 2/64; B60N 2/80; B60N 2/72; G01G 19/414; G01G 19/4142; B60R 21/01516
See application file for complete search history.

(56) References Cited

U.S. PATENT DOCUMENTS

| | | | | |
|---|---|---|---|---|
| 2008/0178689 A1* | 7/2008 | Plocher | .................. | B60N 2/002 73/862.541 |
| 2011/0095580 A1* | 4/2011 | Inayoshi | ................ | B60N 2/002 297/217.1 |
| 2016/0368397 A1* | 12/2016 | Le | ........................... | B60N 2/002 |

FOREIGN PATENT DOCUMENTS

| | | |
|---|---|---|
| JP | 2003-329507 | 11/2003 |
| JP | 2008-143481 | 6/2008 |

OTHER PUBLICATIONS

Computer translation of JP 2003-329507 from the JPO website, Jun. 29, 2018.*

(Continued)

*Primary Examiner* — Randy Gibson

(74) *Attorney, Agent, or Firm* — Oblon, McClelland, Maier & Neustadt, L.L.P.

(57) ABSTRACT

An occupant detection method includes detecting a load applied to a seat for a vehicle, detecting that an occupant is seated at the seat, holding a local maximum of the load which is detected when the occupant becomes seated, setting a standard value of the load in a state in which the occupant is seated at the seat, and estimating a body height of the occupant on the basis of a comparison between the local maximum of the load and the standard value of the load, wherein when the body height of the occupant is estimated, the larger a difference between the local maximum of the load and the standard value of the load is, the higher body height of the occupant is estimated.

13 Claims, 10 Drawing Sheets

(51) Int. Cl.
    *B60N 2/72*        (2006.01)
    *B60N 2/80*        (2018.01)

(56) References Cited

OTHER PUBLICATIONS

Computer translation of JP 2008-143481 from the JPO website, Jun. 29, 2018.*

* cited by examiner

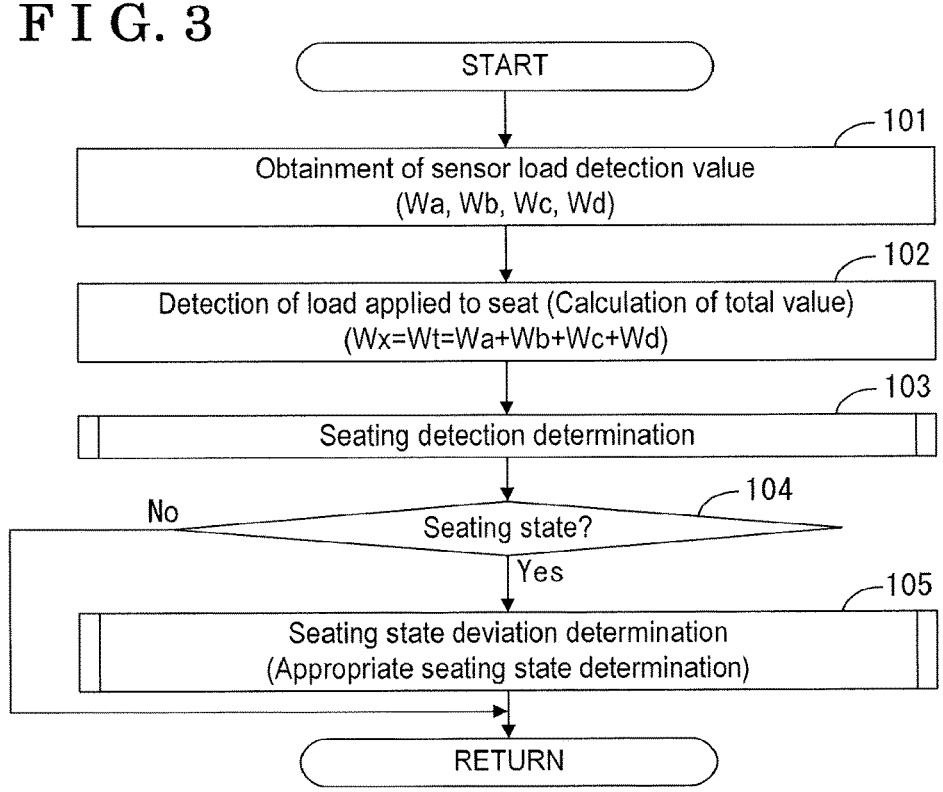
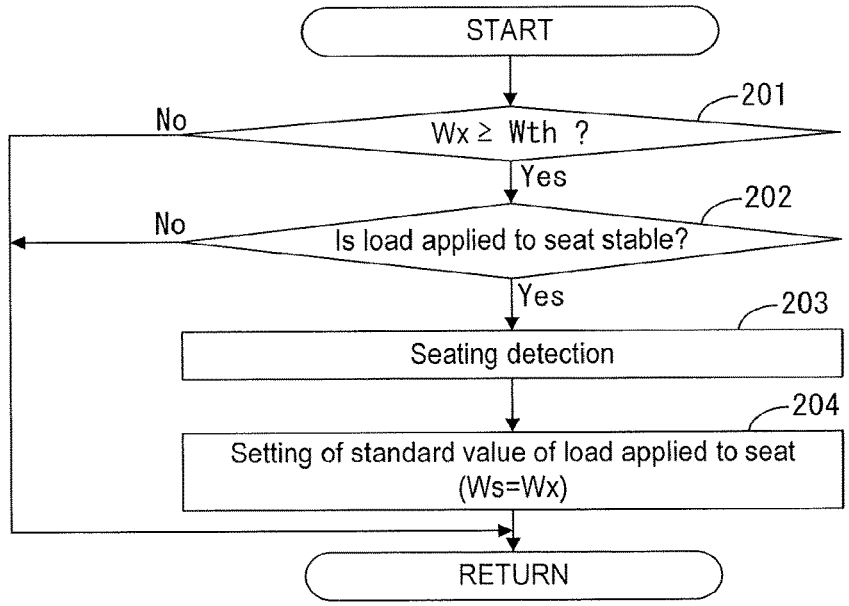

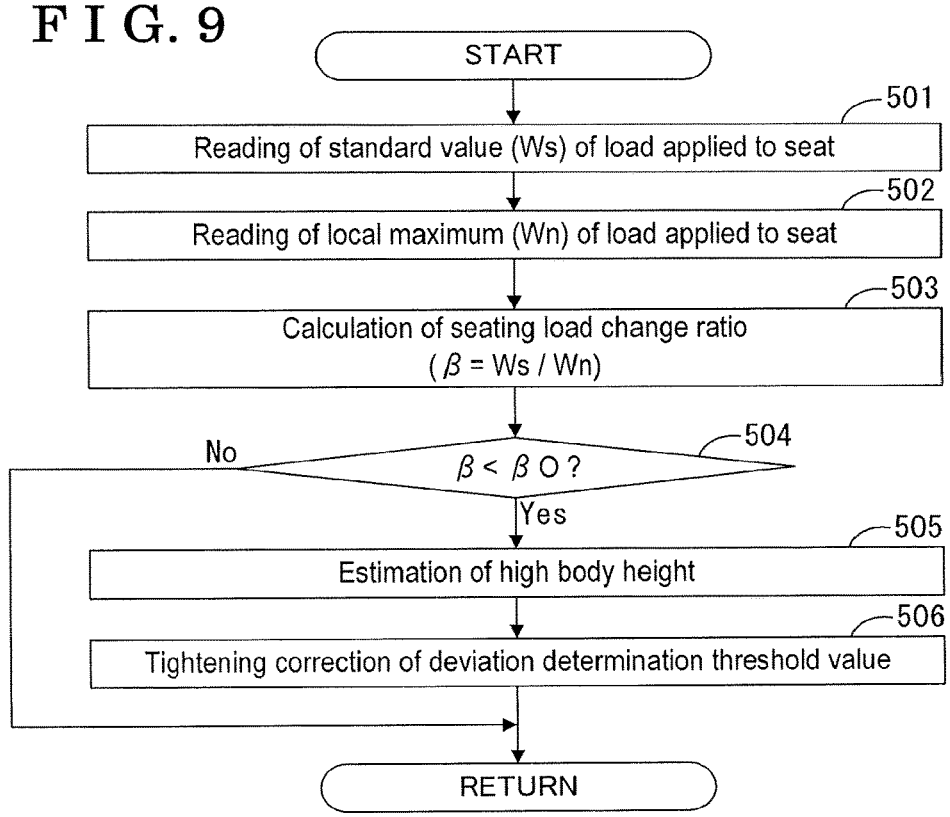
FIG. 9
FIG. 10A
When occupant body height is high
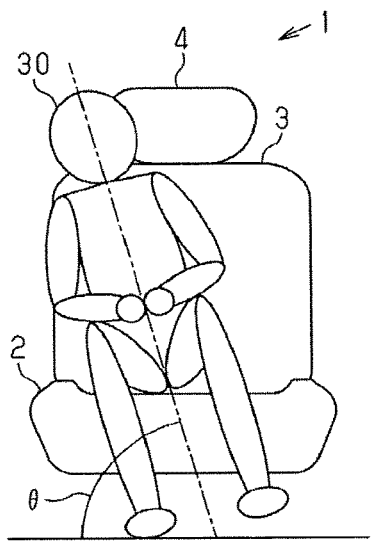
FIG. 10B
When occupant body height is low
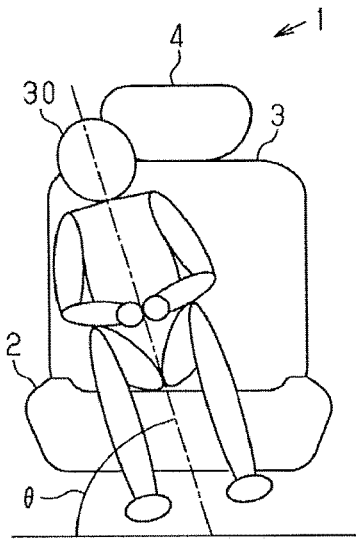

OCCUPANT DETECTION METHOD AND OCCUPANT DETECTION APPARATUS

CROSS REFERENCE TO RELATED APPLICATIONS

This application is based on and claims priority under 35 U.S.C. § 119 to Japanese Patent Application 2015-211183, filed on Oct. 27, 2015, the entire content of which is incorporated herein by reference.

TECHNICAL FIELD

This disclosure generally relates to an occupant detection method and an occupant detection apparatus.

BACKGROUND DISCUSSION

A known occupant detection method is suggested in which seating of an occupant at a seat of a vehicle is detected and a physical build of the occupant is estimated. For example, when an occupant becomes seated at a seat, an occupant detection apparatus described in JP2003-329507A (which will be hereinafter referred to as Patent reference 1) monitors a transition of a seat load that changes with time. The known occupant detection apparatus is configured to estimate a physical build of the occupant by comparing the seat load with first and second threshold values.

That is, when the occupant is getting seated at the seat, a detection value of the seat load is increased due to that the occupant becomes seated onto a seat cushion. Then, the detection value comes to be stabilized at a lower value than the highest value in an increasing process of the detection value, that is, a local maximum in the increasing process of the detection value.

In view of the above-described aspect, the known occupant detection apparatus determines whether or not the detection value of the seat load exceeds the second threshold value that is larger than the first threshold value, after the detection value of the seat load exceeds the first threshold value (refer to FIG. 15 of Patent reference 1) due to the seating of the occupant onto the seat. In a case where the detection value of the seat load does not reach the second threshold value within a predetermined time period, it is determined that the occupant is in a region of a light load, that is, weight of the occupant is light.

In addition, the known technique determines that the occupant is in a region of a heavy load, that is, the weight of the occupant is heavy, in a case where the detection value of the seat load does not fall below the second threshold value within a predetermined time period after the detection value of the seat load exceeds the second threshold value. On the basis of the weight of the occupant that is estimated from the above-explained determination, it is decided whether or not an airbag mounted on the vehicle is to be inflated or not to be inflated, or a working pressure of the airbag is chosen.

Recently, however, a seating state of an occupant at a seat is considered not only in the airbag inflation control but also in various fields of control at a vehicle. Thus, a higher accuracy is required in the estimation of the physical build of the occupant.

That is, in the above-explained known technique, the build of the occupant is estimated to be large in a case where the weight of the occupant is heavy and the build of the occupant is estimated to be small in a case where the weight of the occupant is light. However, a physical build of an occupant whose body height is tall and a physical build of an occupant whose body height is short may differ largely from each other even when the weights of the occupants are the same. Accordingly, there arises a problem that it is difficult to perform the most appropriate airbag inflation control, for example. In this aspect, there remains room for improvement.

A need thus exists for an occupant detection method and an occupant detection apparatus, which are not susceptible to the drawback mentioned above.

SUMMARY

According to an aspect of this disclosure, an occupant detection method includes detecting a load applied to a seat for a vehicle, detecting that an occupant is seated at the seat, holding a local maximum of the load which is detected when the occupant becomes seated, setting a standard value of the load in a state in which the occupant is seated at the seat, and estimating a body height of the occupant on the basis of a comparison between the local maximum of the load and the standard value of the load, wherein when estimating the body height of the occupant, the larger a difference between the local maximum of the load and the standard value of the load is, the higher body height of the occupant is estimated.

According to another aspect of this disclosure, an occupant detection method includes detecting a load applied to a seat for a vehicle, detecting that an occupant is seated at the seat, holding a local maximum of the load which is detected when the occupant becomes seated, setting a standard value of the load in a state in which the occupant is seated at the seat, detecting a deviation of a seating state of the occupant at the seat by monitoring a deviation of the load, and making a determination condition for detecting the deviation of the seating state strict in such a manner that the larger a difference between the local maximum of the load and the standard value of the load is, the stricter the determination condition is made.

According to a further aspect of this disclosure, an occupant detection apparatus includes a load detection portion detecting a load applied to a seat for a vehicle, a seating detection portion detecting that an occupant is seated at the seat, a local maximum holding portion holding a local maximum of the load which is detected when the occupant becomes seated, a standard value setting portion setting a standard value of the load in a state in which the occupant is seated at the seat, a seating state deviation detection portion detecting a deviation of a seating state of the occupant at the seat by monitoring a deviation of the load, and a determination condition change portion making a determination condition for detecting the deviation of the seating state strict in such a manner that the larger a difference between the local maximum of the load and the standard value of the load is, the stricter the determination condition is made.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a flowchart showing procedures of an occupant detection according to the embodiment;

FIG. 4 is a flowchart showing procedures of a seating detection determination detection according to the embodiment;

FIG. 9 is a flowchart showing procedures of tightening a determination condition of a deviation detection of a seating state according to the embodiment;

FIG. 10A is an explanation view showing an influence on the deviation of the load applied to the seat, which is made by the body height of the occupant;

FIG. 10B is another explanation view showing an influence on the deviation of the load applied to the seat, which is made by the body height of the occupant;

DETAILED DESCRIPTION

Figure 1:
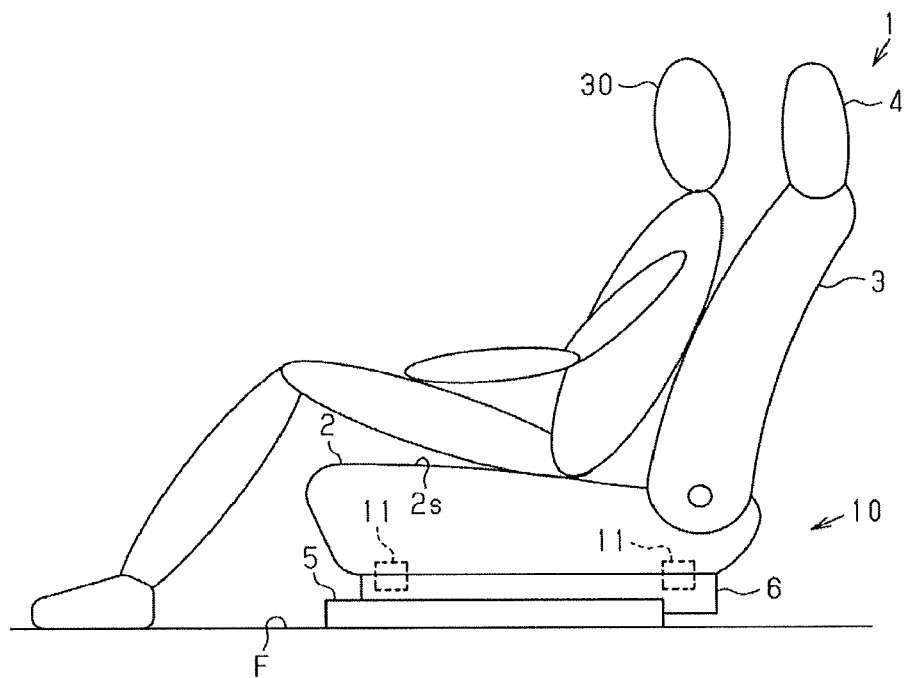
FIG. 1 is a side view of a seat for a vehicle according to an embodiment disclosed here.

An embodiment of an occupant detection apparatus implemented on a seat for a vehicle will be explained hereunder with reference to the drawings. As illustrated in FIG. 1, a seat 1 for a vehicle includes a seat cushion 2, and a seatback 3 provided at a rear end portion of the seat cushion 2 to be tiltable relative to the rear end portion of the seat cushion 2. A headrest 4 is provided at an upper end of the seatback 3.

In the embodiment, a pair of lower rails 5, 5 arranged at right and left, respectively, is provided at a floor portion F of the vehicle so as to extend in a vehicle front and rear direction. An upper rail 6 is attached to each lower rail 5 to be movable on the lower rail 5 relative to the lower rail 5 in an extending direction thereof. The seat 1 of the embodiment is configured to be supported above a seat slide apparatus 10 formed by each of the lower rails 5 and the upper rails 6.

Figure 2:
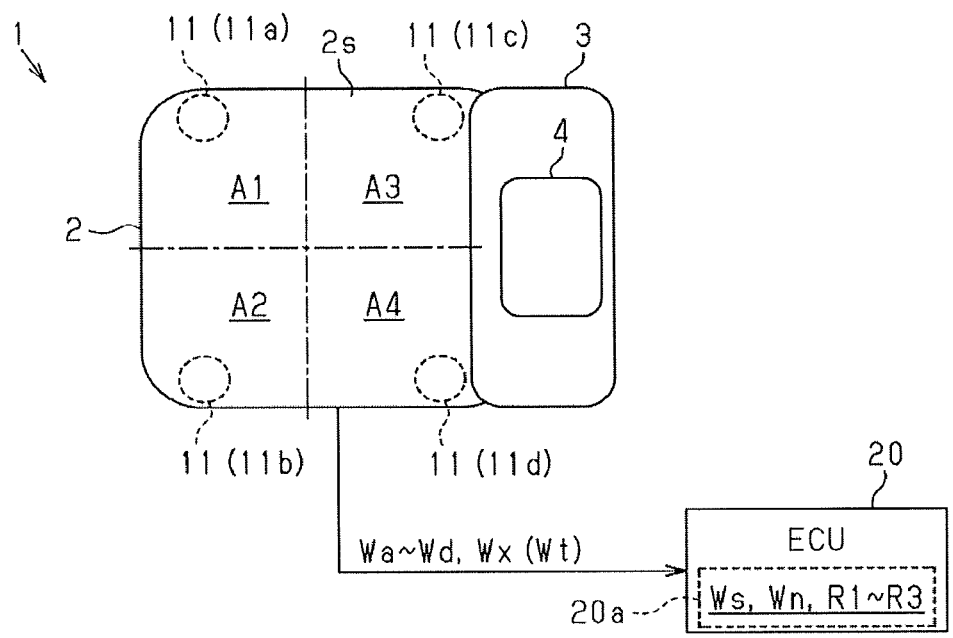
FIG. 2 is a schematic view illustrating load sensors provided below the seat, and an ECU serving as an occupant detection apparatus according to the embodiment.

As illustrated in FIGS. 1 and 2, in the embodiment, plural load sensors 11 are provided below the seat 1. Specifically, the load sensors 11 (that is, the load sensors 11a, 11b, 11c, 11d) are interposed between the upper rails 6 and the seat 1, more specifically, between the upper rails 6 and a frame of the seat cushion 2 of the seat 1. The upper rails 6 serve as a support member forming the seat slide apparatus 10 and the seat 1 is supported above the upper rails 6, as described above. A known strain gauge is used for the load sensor 11. The load sensors 11 are arranged at positions corresponding to the four corner portions of the seat cushion 2 including a seating surface 2s formed in a substantially rectangular.

As illustrated in FIG. 2, an output signal of each of the load sensors 11 is inputted to an ECU 20 serving as an occupant detection apparatus. The ECU 20 of the embodiment is configured to detect a load applied to the seat (a sensor load detection value Wa, Wb, Wc, Wd) for each of four regions in which the respective load sensors 11a to 11d are provided, on the basis of the output signal of each of the load sensors 11a to 11d. The four regions correspond to regions A1, A2, A3, A4 that are obtained or defined by dividing the seating surface 2s of the seat cushion 2 into four, that is, into front, rear, right and left portions.

That is, the sensor load detection value Wa from the first load sensor 11a indicates a load applied to the seat, at a front outer side (an outer side, that is, the region A1 of FIG. 2) of the seat 1. The sensor load detection value Wb from the second load sensor 11b indicates a load applied to the seat, at a front inner side (an inner side, that is, the region A2 of FIG. 2) of the seat 1. The sensor load detection value Wc from the third load sensor 11c indicates a load applied to the seat, at a rear outer side (the region A3 of FIG. 2) of the seat 1. The sensor load detection value Wd from the fourth load sensor 11d indicates a load applied to the seat, at a rear inner side (the region A4 of FIG. 2) of the seat 1.

The ECU 20 of the embodiment calculates a total value Wt of the sensor load detection values Wa, Wb, Wc, Wd. At the ECU 20, the total value Wt of the sensor load detection values Wa, Wb, Wc, Wd corresponds to a detection value Wx of the load applied to the seat 1, that is, the detection value of the load at a whole of the seat 1 (that is, Wx=Wt=Wa+Wb+Wc+Wd). The ECU 20 of the embodiment is configured to detect a seating state of an occupant 30 at the seat 1 on the basis of the sensor load detection values Wa to Wd, and the detection value Wx of the load applied to the seat which corresponds to the total value Wt of the sensor load detection values Wa to Wd.

In detail, as shown in the flowchart of FIG. 3, the ECU 20 of the embodiment obtains the sensor load detection values Wa to Wd (Step S101). Thereafter the ECU 20 calculates the total value Wt of the sensor load detection values Wa to Wd, and allows the total value Wt to be the detection value Wx of the load applied to the entire seat 1 (Step S102). Then, on the basis of the detection value Wx of the load applied to the seat, the ECU 20 determines whether or not the occupant 30 is in a state of being seated at the seat 1 (a seating detection determination, Step S103).

Specifically, as shown in the flowchart of FIG. 4, in the seating detection determination (refer to FIG. 3, Step S103), the ECU 20 of the embodiment determines whether or not the detection value Wx of the load applied to the seat is equal to or greater than a predetermined threshold value Wth (Step S201). In addition, the ECU 20 determines whether or not the detection value Wx of the load applied to the seat is stable (Step S202). In a determination on a stable state of the load applied to the seat, the ECU 20 of the embodiment determines that the detection value Wx of the load applied to the seat is stable in a case where the detection value Wx of the load applied to the seat stays within a predetermined variation range or a predetermined fluctuation range for a predetermined time period. Then, the ECU 20 determines that the occupant 30 is seated at the seat 1 (a seating detection, Step 203) in a case where the detection value Wx of the load applied to the seat is equal to or greater than the threshold value Wth (Wx≥Wth, Step 201: YES) and the detection value Wx of the load applied to the seat is stable (Step S202: YES).

In a case where the ECU 20 of the embodiment detects the seating of the occupant 30 onto the seat 1 in Step S203, the ECU 20 thereafter sets the detection value Wx of the load applied to the seat, the detection value Wx which is detected at that time, as a standard value Ws of the load applied to the seat in a state in which the occupant 30 is seated at the seat 1 (Step S204). Then, the ECU 20 holds (store or memorize) the standard value Ws of the load applied to the seat, which is set in the above-described manner, in a memory area 20a (refer to FIG. 2).

As shown in the flowchart of FIG. 3, in the seating detection determination of Step S103, in a case where the ECU 20 of the embodiment detects that the occupant 30 is in the state of being seated at the seat 1 (Step S104: YES), the ECU 20 determines whether or not the occupant 30 is in a seating state which is deviated in any direction (a seating state deviation determination, Step S105). Then, at the vehicle of the embodiment, an inflation control mode of an airbag mounted on the vehicle is configured to be chosen, and an alarm output using, for example, warning lamp and/or a loudspeaker is performed, on the basis of a result of the seating state deviation determination, that is, on the basis of whether or not the seating state of the occupant at the seat 1 is appropriate.

In detail, the ECU 20 of the embodiment determines whether or not a deviation of the load applied to the seat is generated at the seat 1 at which the occupant 30 is seated. On the basis of the determination, the ECU 20 detects that the occupant 30 at the seat 1 is in the deviated seating state while being deviated in the direction in which the deviation of the load applied to the seat is generated.

Figure 5:
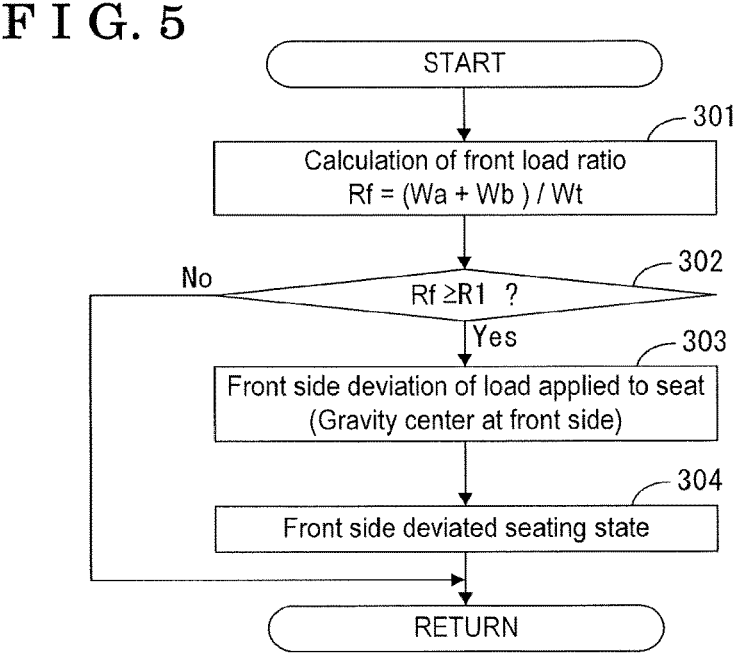
FIG. 5 is a flowchart showing procedures of a seating state deviation determination (a front side deviation) according to the embodiment.
Figure 6:
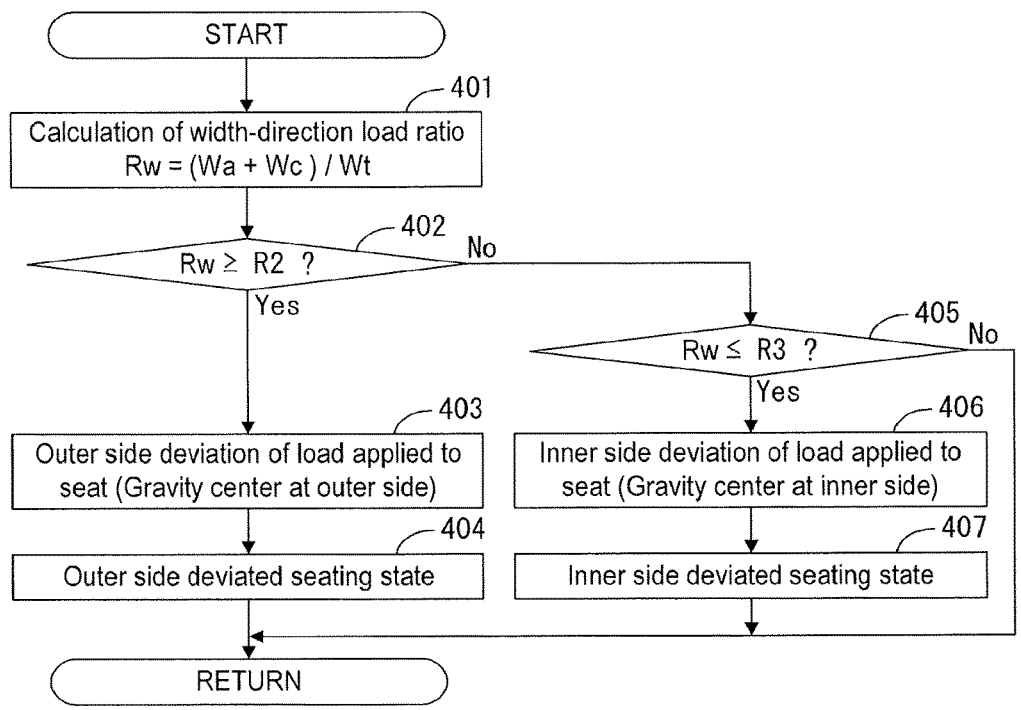
FIG. 6 is a flowchart showing procedures of the seating state deviation determination (a width-direction deviation) according to the embodiment.

Specifically, as shown in the flowchart of FIG. 5, the ECU 20 divides a total value of the sensor load detection values Wa and Wb by the total value Wt of the sensor load detection values Wa to Wd, and thereby calculating a front load ratio Rf of the seat 1 (Rf=(Wa+Wb)/Wt, Step S301). The sensor load detection values Wa and Wb represent the front load of the seat 1 (refer to FIG. 2, the loads applied to the seat in the regions A1 and A2). Further, the ECU 20 determines whether or not the front load ratio Rf is equal to or greater than a predetermined threshold value R1 (Step S302). In a case where the ECU 20 determines that the front load ratio Rf is equal to or greater than the predetermined threshold value R1 (Rf≥R1, Step 302: YES), the ECU 20 determines that the load applied to the seat is in the state of being deviated towards the front side (a gravity center at the front side, Step S303). Accordingly, the ECU 20 detects that the occupant 30 at the seat 1 is in a seating state which is deviated towards the front side (Step 304). In addition, as illustrated in the flowchart of FIG. 6, the ECU 20 divides a total value of the sensor load detection values Wa and Wc by the total value Wt of the sensor load detection values Wa to Wd, and thereby calculating a width-direction load ratio Rw of the seat 1 (Rw=(Wa+Wc)/Wt, Step S401). The sensor load detection values Wa and Wc represent an outer side load of the seat 1 (refer to FIG. 2, the loads applied to the seat in the regions A1 and A3). Further, the ECU 20 determines whether or not the width-direction load ratio Rw is equal to or greater than a predetermined threshold value R2 (Step S402). In a case where the ECU 20 determines that the width-direction load ratio Rw is equal to or greater than the predetermined threshold value R2 (Rw≥R2, Step 402: YES), the ECU 20 determines that the load applied to the seat is in the state of being deviated towards a vehicle width direction outer side (a gravity center at an outer side, Step S403). Accordingly, the ECU 20 detects that the occupant 30 at the seat 1 is in a seating state which is deviated towards the vehicle width direction outer side (an outer side deviated seating state, Step S404).

On the other hand, in a case where the ECU 20 determines that the width-direction load ratio Rw is smaller than the predetermined threshold value R2 (Rw<R2, Step 402: NO) in Step 402, the ECU 20 then determines whether or not the width-direction load ratio Rw is equal to or smaller than a predetermined threshold value R3 (Step S405). In a case where the ECU 20 determines that the width-direction load ratio Rw is equal to or smaller than the predetermined threshold value R3 (Rw≤R3, Step 405: YES), the ECU 20 determines that the load applied to the seat is in a state of being deviated towards a vehicle width direction inner side (a gravity center at an inner side, Step S406). Accordingly, the ECU 20 detects that the occupant 30 at the seat 1 is in a seating state which is deviated towards the vehicle width direction inner side (an inner side deviated seating state, Step S407).

Figure 7:
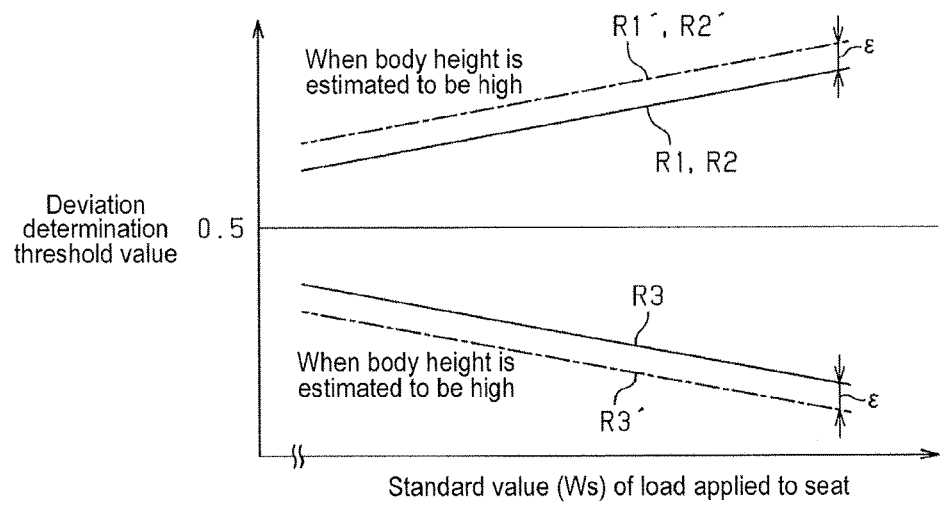
FIG. 7 is an explanation view illustrating a relationship between a standard value of a load applied to the seat and a deviation determination threshold value, and illustrating a state of a tightening correction when a body height of an occupant is estimated to be high or tall according to the embodiment.

As illustrated in FIG. 7, the ECU 20 of the embodiment holds the threshold values R1 to R3 which are used for a deviation determination of the load applied to the seat, that is, which are used for the seating state deviation determination, in the memory area 20a in a form of a map on which the threshold values R1 to R3 are associated with the standard value Ws of the load applied to the seat (refer to FIG. 2).

Specifically, in the embodiment, when the seating of the occupant 30 is detected, the larger standard value Ws of the load applied to the seat is set, the larger value the ECU 20 sets as the threshold value R1 of a front side deviation determination (refer to FIG. 5, Step S302). In addition, the larger standard value Ws of the load applied to the seat is set, the larger value the ECU 20 sets as the threshold value R2 of an outer side deviation determination (refer to FIG. 6, Step S402) is. In addition, the larger standard value Ws of the load applied to the seat is set, the smaller value the ECU 20 sets as the threshold value R3 of an inner side deviation determination (refer to FIG. 6, Step S405).

In other words, in a case where weight of the occupant 30 that is presented by the standard value Ws of the load applied to the seat is heavy, the deviation of the load applied to the seat becomes obvious easily, that is, characteristically, the deviation of the load at the seat is easily appears in the front load ratio Rf and/or the width-direction load ratio Rw. In consideration of this aspect, the ECU 20 of the embodiment makes a determination condition for the detection of the deviation of the seating state stricter in such a manner that the larger value is set as the standard value Ws of the load applied to the seat, the stricter the determination condition is made. Accordingly a detection accuracy of the deviated seating state is enhanced.

Figure 8:
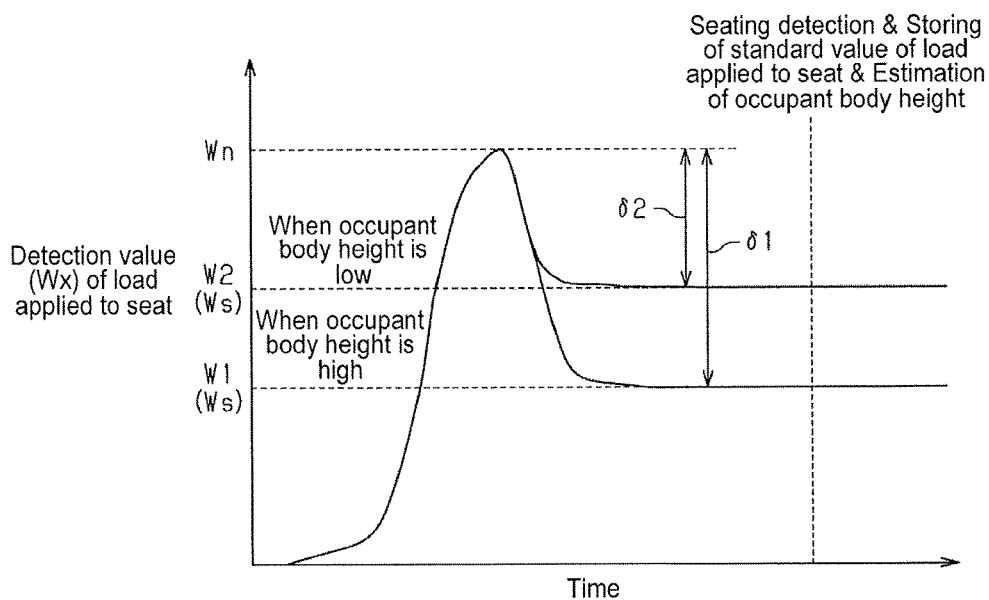
FIG. 8 is an explanation view illustrating a transition of a detection value of the load applied to the seat when the occupant becomes seated according to the embodiment.

As illustrated in FIG. 8, at the seating detection determination (refer to FIG. 3, Step S103), the ECU 20 of the embodiment monitors a transition of the detection value Wx of the load applied to the seat for a duration while the detection value Wx increases from a value indicating a state where the occupant 30 is not seated at the seat 1 (that is, zero point) until it is determined that the occupant 30 is in the state of being seated at the seat 1 thereafter (refer to FIG. 4, Step 203). At this time, the ECU 20 holds, in the memory area 20a, a local maximum or a local maximum value (a peak value) Wn of the load applied to the seat which is detected when the occupant 30 becomes seated at the seat 1. Then, the ECU 20 of the embodiment estimates a body height or body length of the occupant 30 seated at the seat 1 on the basis of a difference between the local maximum Wn of the load applied to the seat and the standard value Ws of the load applied to the seat which are held in the memory area 20a.

That is, when the occupant 30 is getting seated or becomes seated relative to the seat 1, the detection value Wx of the load applied to the seat increases as the occupant 30 becomes seated on the seat cushion 2 and the largest value in a process of load increment, that is, the local maximum Wn, is detected due to that the occupant 30 places or puts his or her weight onto the seat 1. Thereafter, the detection value Wx of the load applied to the seat becomes stabilized at a value lower than the local maximum Wn, which is the local maximum during the seating of the occupant 30 onto the seat 1, due to that the occupant 30 lowers his or her feet or foot on the floor portion F of the vehicle and thus the occupant 30 supports part of the weight. Amount of change ($\delta 1$, $\delta 2$) of the load applied to the seat corresponds to the decrement from the local maximum Wn. The higher the body height of the occupant 30 is, the larger the amount of the change $\delta 1$, $\delta 2$ of the load tends to be ($\delta 1 > \delta 2$).

Generally, the taller a person is, the longer his or her legs are. Thus, the higher the body height of the occupant 30 is, the higher a rate is at which the occupant 30 supports the weight with his or her own feet placed down on the floor portion F of the vehicle. Accordingly, the amount of the change in the load decreasing from the local maximum Wn of the load applied to the seat is large. That is, the difference between the local maximum Wn of the load applied to the seat, and the standard value Ws of the load applied to the seat in a state where the occupant 30 is seated at the seat 1 is also large.

In FIG. 8, a detection value W1 is a value set as the standard value Ws of the load applied to the seat in a case where the occupant 30 at the seat 1 includes a high body height and a detection value W2 is a value set as the standard value Ws of the load applied to the seat in a case where the occupant 30 at the seat 1 includes a low body height ($\delta 1 \simeq |Wn-W1| > |Wn-W2| \simeq \delta 2$). In the above-stated expression, the symbol "$\simeq$" represents "asymptotically equals to or approximately equals to".

The ECU of the embodiment estimates the body height of the occupant 30 seated at the seat 1 by utilizing the above-described characteristics. Then, the ECU 20 is configured to correct each of the threshold values R1 to R3 for the seating state deviation determination (refer to FIGS. 5 and 6) on the basis of the estimated body height of the occupant 30.

Specifically, as shown in the flowchart of FIG. 9, first, the ECU 20 of the embodiment reads out or retrieves the standard value Ws of the load applied to the seat and the local maximum Wn of the load applied to the seat from the memory area 20a (Step S501 and Step S502). Then, the ECU 20 divides the standard value Ws of the load applied to the seat by the local maximum Wn of the load applied to the seat, thereby to calculate a change ratio of the load applied to the seat at a time of seating (a seating load change ratio: $\beta = Ws/Wn$, Step S503). The seating load change ratio $\beta$ serves as a value representing the difference between the local maximum Wn of the load applied to the seat and the standard value Ws of the load applied to the seat.

Next, the ECU 20 determines whether or not the seating load change ratio $\beta$ is smaller than a predetermined threshold value $\beta 0$. The ECU 20 estimates that the occupant 30 seated at the seat 1 includes a high body height (Step S505) in a case where the seating load change ratio $\beta$ is smaller than the predetermined threshold value $\beta 0$ (Step 504: YES) and tightens the determination condition for detecting the deviation of the seating state (a tightening correction of the deviation determination threshold value, Step S506).

That is, as illustrated in FIGS. 10A and 10B, in a case where the occupant 30 seated at the seat 1 includes a high body height, a gravity center of the occupant 30 is shifted largely by an inclination of a seating posture of the occupant 30 (in a case where an inclination angle $\theta$ is equal between cases where the body height of the occupant 30 is high and low). Accordingly, the deviation of the load applied to the seat becomes obvious, and thus it is easily determined or it is more likely determined that the seating state includes the deviation even in a case where the inclination of the seating posture and/or a displacement of a seating position are smaller.

In light of the above-described aspect, in a case where the ECU 20 of the embodiment determines that the occupant 30 includes a high body height, the ECU 20 corrects the threshold value R1 used for the front side deviation determination of the load applied to the seat (refer to FIG. 5, Step S302) so that the threshold value R1 becomes a larger value. In addition, the ECU 20 corrects the threshold value R2 used for the outer side deviation determination of the load applied to the seat (refer to FIG. 6, Step S402) so that the threshold value R2 becomes a larger value. Further, the ECU 20 corrects the threshold value R3 used for the inner side deviation determination of the load applied to the seat (refer to FIG. 6, Step S405) so that the threshold value R3 becomes a smaller value Specifically, as shown in FIG. 7, the ECU 20 of the embodiment adds or subtracts a predetermined correction value ε relative to the threshold values R1 to R3 (threshold values R1', R2' and R3' which are indicated with the alternate long and short dash lines in FIG. 7). As described above, the ECU 20 makes the determination condition for detecting the deviation of the seating state stricter, and thus the detection accuracy of the deviated seating state is enhanced.

According to the embodiment, the following effects are obtained. (1) The ECU 20 serving as a load detection portion and a seating detection portion detects the seating of the occupant 30 at the seat 1 on the basis of the output signals of the load sensors 11 provided at the seat cushion 2, that is, the ECU 20 detects that the occupant 30 is seated relative to the seat 1. The ECU 20 serving as a local maximum holding portion and a standard value setting portion holds thereat the local maximum Wn of the load applied to the seat which is detected when the occupant 30 is getting seated at the seat 1, and sets the standard value Ws of the load applied to the seat in the state where the occupant 30 is seated at the seat 1. The ECU 20 serving as a body height estimation portion divides the standard value Ws of the load applied to the seat by the local maximum Wn of the load applied to the seat, and thereby calculating the seating load change ratio β that corresponds to the value indicating the difference between the standard value Ws of the load applied to the seat and the local maximum Wn of the load applied to the seat (β=Ws/Wn). The ECU 20 estimates that the occupant 30 seated at the seat 1 has a high or tall body height in a case where the seating load change ratio β is smaller than the predetermined threshold value β0 (β<β0), that is, in a case where the difference between the local maximum Wn of the load applied to the seat and the standard value Ws of the load applied to the seat is determined as large.

That is, when the occupant 30 is getting seated at the seat 1, the detection value Wx of the load applied to the seat increases as the occupant 30 places his or her buttocks down onto the seat cushion 2 and the local maximum Wn is detected as the occupant 30 places his or her weight onto the seat 1. Thereafter, the detection value Wx of the load applied to the seat becomes stabilized at the value lower than the local maximum Wn, which is the local maximum during the seating of the occupant 30 at the seat 1, due to that the occupant 30 lowers his or her feet on the floor portion F of the vehicle and thus part of the weight of the occupant 30 is supported. Here, each of the amounts of the changes (δ1, δ2) of the loads applied to the seat corresponds to the decrement from the local maximum Wn. The higher the body height of the occupant 30 is, the larger the amount of the change (δ1, δ2) of the load applied to the seat tends to be (δ1>δ2).

Generally, the taller a person is, the longer his or her legs are. Thus, the higher or taller the body height of the occupant 30 is, the higher the rate is at which the occupant 30 supports the weight with his or her own feet placed down to the floor portion F of the vehicle. Accordingly, the amount of the change in the load applied to the seat, which decreases from the local maximum Wn of the load is large. In other words, the difference between the local maximum Wn of the load applied to the seat, and the standard value Ws of the load applied to the seat in the state where the occupant 30 is seated is also large. Consequently, according to the above-described configuration, on the basis of the load applied to the seat, it can be estimated accurately that the occupant 30 seated at the seat 1 has a high body height.

(2) The ECU 20 serving as a seating state deviation detection portion monitors the deviation of the load applied to the seat on the basis of the sensor load detection values Wa to Wd detected by the respective load sensors 11 provided at the positions corresponding to the four corner portions of the seat cushion 2 and on the basis of the detection value Wx of the load applied to the whole of the seat 1 which corresponds to the total value Wt of the sensor load detection values Wa to Wd. In addition, the ECU 20 serving as the seating state deviation detection portion detects that the occupant 30 is seated in a state of being deviated in the direction in which the deviation of the load applied to the seat is generated. The ECU 20 serving as a determination condition change portion makes the determination conditions for detecting the deviation of the seating state of the occupant 30 at the seat 1 strict in a case where the difference between the standard value Ws of the load applied to the seat in a state where the occupant 30 is seated at the seat 1 and the local maximum Wn of the load applied to the seat is large.

That is, in a case where the occupant 30 seated at the seat 1 has a tall or high body height, the gravity center of the occupant 30 is largely moved due to the inclination of the seating posture of the occupant 30. Accordingly, the deviation of the load applied to the seat easily becomes obvious, and thus it is easily detected that seating sate of the occupant 30 includes the deviation even in a case where the inclination of the seating posture and/or the displacement of the seating position are smaller.

In a case where the body height of the occupant 30 seated at the seat 1 is tall, however, also the difference between the local maximum Wn of the load applied to the seat and the standard value Ws of the load applied to the seat also tends to be large. According to the above-described configuration, a most appropriate determination condition depending on the body height of the occupant 30 which is estimated from the difference between the local maximum Wn of the load applied to the seat and the standard value Ws of the load applied to the seat is set for the detection of the deviation in the seating state of the occupant 30. Accordingly, it is detected more accurately that the occupant 30 at the seat 1 is in the deviated seating state.

(3) The larger the standard value Ws of the load applied to the seat is set, the stricter the determination condition for detecting the deviation of the seating state is made by the ECU 20 serving as a second determination condition change portion. That is, in a case where the weight of the occupant 30 is heavy, the deviation of the load applied to the seat becomes obvious easily. The larger the standard value Ws of the load applied to the seat is set, the heavier the weight is estimated to be, if the body height is the same. Consequently, according to the above-described configuration, a most appropriate determination condition is set depending on the weight of the occupant 30 which is indicated by the standard value Ws of the load applied to the seat. Thus, it can be detected more accurately that the occupant 30 seated at the seat 1 is in the seating state which is deviated.

(4) After the seating of the occupant 30 onto the seat 1 is detected, the ECU 20 serving as a load standard value setting portion holds the detection value Wx of the load applied to the seat as the standard value Ws of the load applied to the seat in a case where the detection value Wx is stable.

That is, in most cases in which the occupant 30 is getting seated at the seat 1, the occupant 30 is once in an appropriate seating state without deviation. In this state, the stabilized detection value Wx of the load applied to the seat is set as the standard value Ws of the load applied to the seat, and accordingly it is detected more accurately that the occupant 30 is in the deviated seating state.

The aforementioned embodiment may be changed or modified as follows. In the aforementioned embodiment, the load sensors 11 (the load sensors 11a to 11d) are arranged below the seat 1 to be positioned at the positions corresponding to the four corner portions of the seat cushion 2 of the seat 1. However, the number and the arrangement of the load sensors 11, which are used for the detection of the load applied to the seat and for the detection of the deviation of the load, are not limited thereto, and may be arbitrarily changed. The number of the detection sensors 11 may be two, three, five or more than five. For example, according to a configuration including two of the load sensors 11 that are arranged to be apart from each other in the front and rear direction of the seat 1, the deviation, of the load applied to the seat, which is generated in the front and rear direction can be detected. According to a configuration including two of the load sensors 11 that are arranged to be apart from each other in the vehicle width direction, the deviation, of the load applied to the seat, which is generated in the vehicle width direction (that is, at the inner side and the outer side) can be detected.

Figure 11:
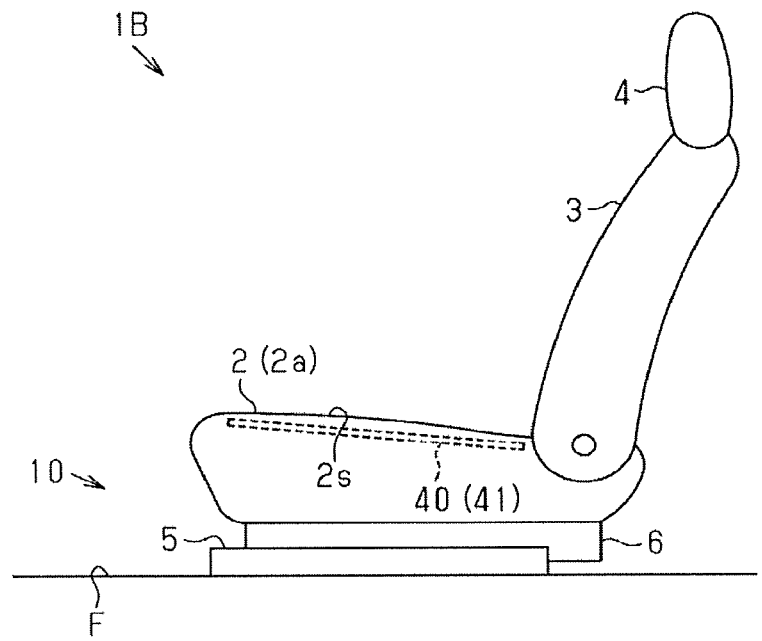
FIG. 11 a side view of the seat for the vehicle provided with a pressure sensor.

As illustrated in FIG. 11, a seating sensor 40 forming a pressure-sensitive portion at the seating surface 2s of the seat cushion 2 may be included in the configuration. Specifically, at a seat 1B illustrated in FIG. 11 as an example, a pressure sensor 41 including plural pressure-sensitive points and formed in a sheet shape is used for the seating sensor 40. The pressure sensor 41 is arranged at a bottom side or a reverse side of a seat facing 2a, and accordingly the pressure-sensitive points are formed over the entire region of the seating surface 2s.

That is, a pressure distribution at the seating surface 2s is detected with the use of the seating sensor 40. The deviation of the load applied to the seat is detected on the basis of the pressure distribution. By applying the above-described configuration, the number of the load sensors 11 can be reduced to one. In this case, the load sensor 11 may be arranged at a position corresponding to a center or an approximate center of the seating surface 2s. In addition, the seating sensor 40 may be configured to detect the seating of the occupant 30 onto the seat 1B. In a case where the pressure sensor 41 forming the seating sensor 40 is capable of detecting a load value, that is, in a case where the pressure sensor 41 includes a function as the load sensor, the strain gauge can be omitted from the configuration, the strain gauge which is interposed between the seat 1 and the support member of the seat 1, such as the load sensors 11 of the aforementioned embodiment.

In the aforementioned embodiment, after the seating of the occupant 30 at the seat 1 is detected, the detection value Wx of the load applied to the seat is held as the standard value Ws of the load applied to the seat in a case where the detection value Wx is stable.

Figure 12:
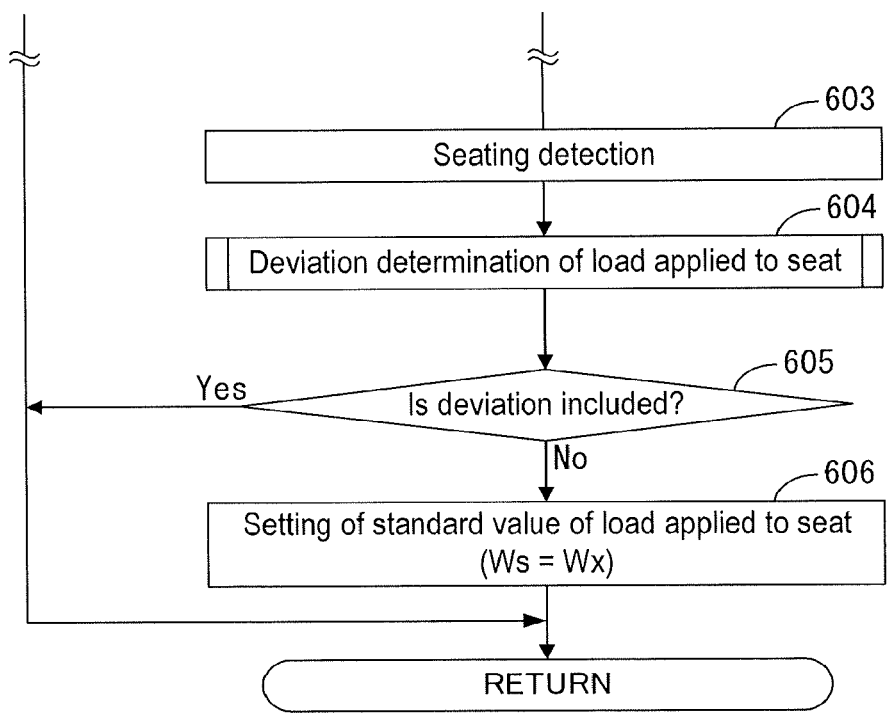
FIG. 12 is a flowchart showing procedures of setting the standard value of the load applied to the seat according to another example disclosed here.

However, the disclosure is not limited thereto. As shown in the flowchart of FIG. 12, after the seating of the occupant 30 relative to the seat 1 is detected at Step S603, the deviation determination of the load applied to the seat is performed (Step S604). The detection value Wx of the load applied to the seat which is detected at this time is held (stored or memorized) in the memory area 20a as the standard value Ws of the load applied to the seat (Step S606) under the condition that the load applied to the seat does not include the deviation (Step S605: NO).

The processing from Step S601 to Step S603 is the same as the processing from Step S201 to Step S203 in the flowchart shown in FIG. 4. By applying the above-described configuration, it can be detected more accurately that the occupant 30 at the seat 1 is in the deviated seating state. It may be configured such that the detection value Wx of the load applied to the seat is set as the standard value Ws of the load applied to the seat at other time than the immediate after the detection of the seating of the occupant 30, if the detection value Wx is stabilized and the load applied to the seat does not include the deviation.

In the aforementioned embodiment, the predetermined correction value ε is added to or is subtracted from the threshold values R1 to R3 used for the deviation determination so that the determination conditions specified by the respective threshold values R1 to R3 are made strict or tightened. However, the disclosure is not limited thereto and the determination condition may be made strict in other method including, for example, multiplication of a predetermined correction coefficient.

In the aforementioned embodiment, the standard value Ws of the load applied to the seat is divided by the local maximum Wn of the load applied to the seat, and thus the change ratio of the load applied to the seat at the time of seating, that is, the seating load change ratio β, is calculated (β=Ws/Wn). In a case where the seating load change ratio β is smaller than the predetermined threshold value β0 (refer to FIG. 9, Step 504: YES), it is estimated that the occupant 30 seated at the seat 1 has a high or tall body height. However, the disclosure is not limited thereto. For example, a threshold value related to the difference between the standard value Ws of the load applied to the seat and the detection value Wx of the load applied to the seat may be held or stored for each weight of the occupant 30 which is indicated by the standard value Ws of the load applied to the seat. Whether the body height is high or low may be estimated on the basis of a comparison with the threshold.

Figure 13:
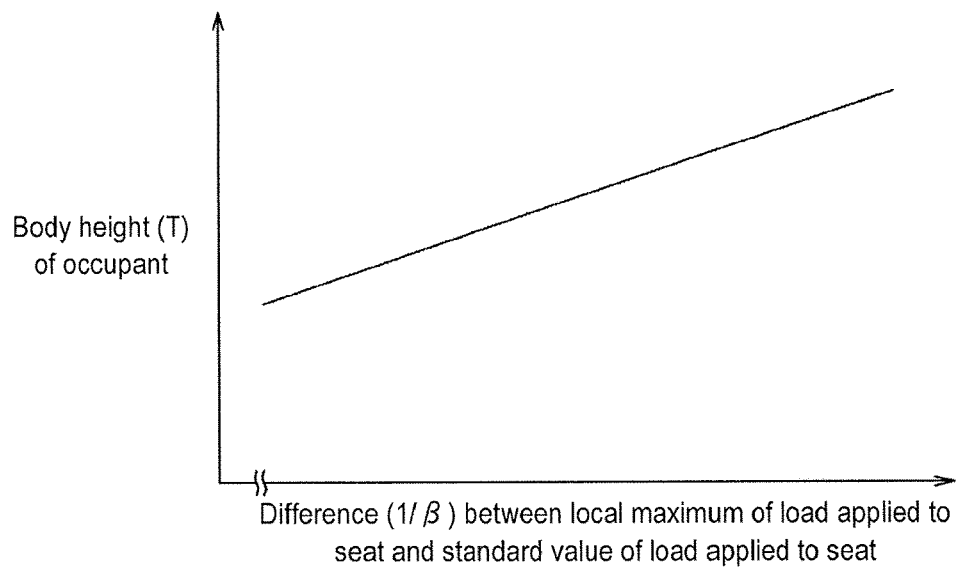
FIG. 13 is an explanation view showing a manner of estimating the body height of the occupant on the basis of a difference between a local maximum of the load applied to the seat and the standard value of the load applied to the seat (a reciprocal of a seating load change ratio)
Figure 14:
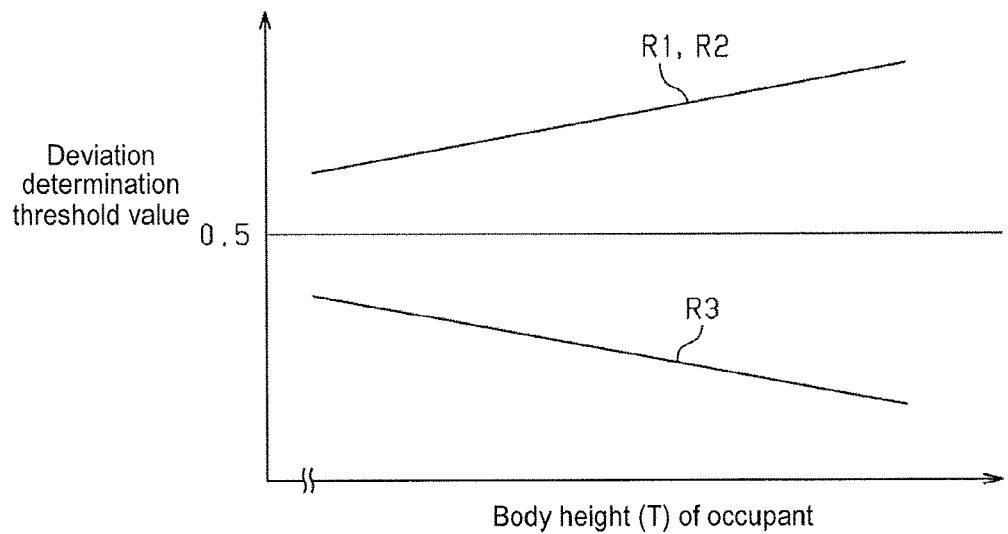
FIG. 14 is an explanation view showing a manner of tightening the determination condition of the deviation detection of the seating state on the basis of the body height of the occupant.

In addition, as shown in FIG. 13, a body height T of the occupant 30 may be estimated continually or in a multi-step manner, on the basis of the difference between the local maximum Wn of the load applied to the seat and the standard value Ws of the load applied to the seat. For example, in the example shown in FIG. 13, a relationship between the body height T of the occupant 30 and the reciprocal of the seating load change ratio β (1/β) is held or stored in a form of a map. The larger the difference between the local maximum Wn of the load applied to the seat and the standard value Ws of the load applied to the seat is, the taller body height T of the occupant 30 is estimated. Then, as shown in FIG. 14, the threshold values R1 to R3 used in the deviation determination may be changed in such a manner that the taller the estimated body height T of the occupant 30 is, the stricter the determination condition for detecting the deviation of the seating state becomes.

Figure 15:
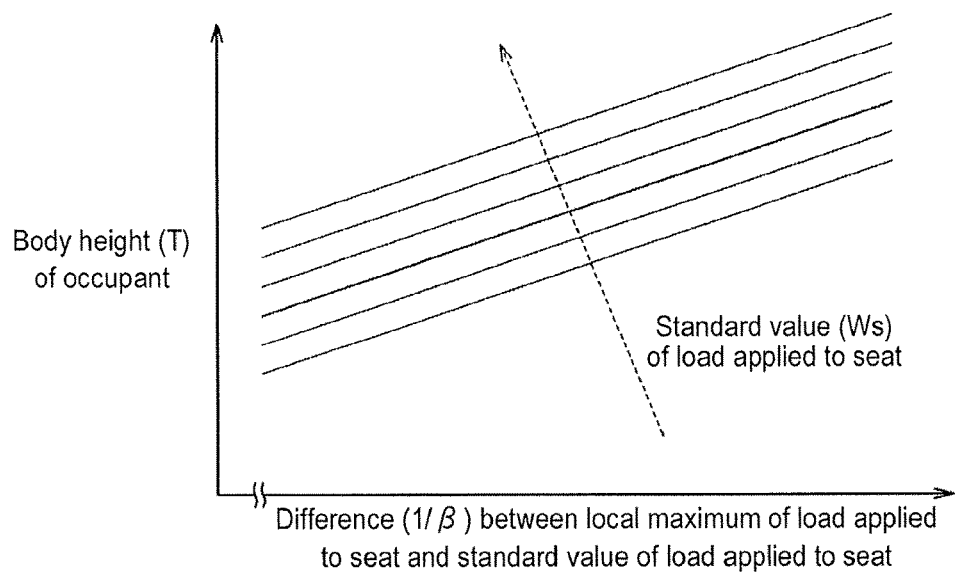
FIG. 15 is an explanation view showing a manner of estimating the body height of the occupant on the basis of the difference between the local maximum of the load applied to the seat and the standard value of the load applied to the seat (the reciprocal of the seating load change ratio), and on the basis of the standard value of the load applied to the seat.

Further, as shown in FIG. 15, a relationship between the body height T of the occupant 30 and the reciprocal of the seating load change ratio β (1/β) may be held or stored in a form of a three-dimensional map including a relationship with the standard value Ws of the load applied to the seat, such that the heavier the weight of the occupant 30 is, the taller the body height T of the occupant 30 is estimated. Accordingly, the body height of the occupant 30 seated at the seat 1 can be detected more accurately.

Figure 16:
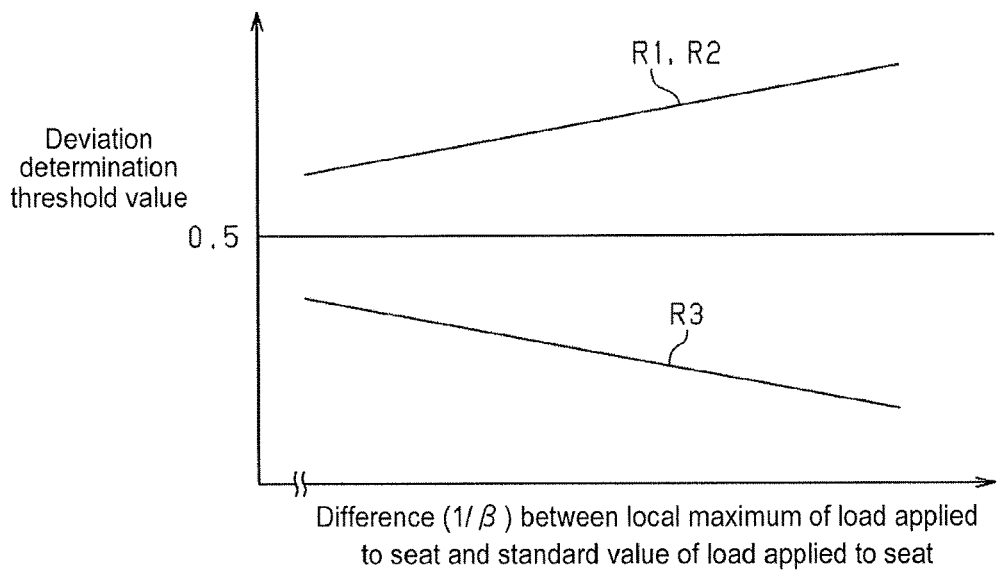
FIG. 16 is an explanation view showing a manner of tightening the determination condition of the deviation detection of the seating state on the basis of the difference between the local maximum of the load applied to the seat and the standard value of the load applied to the seat (the reciprocal of the seating load change ratio)

In addition, as shown in FIG. 16, a value indicating the difference between the local maximum Wn of the load applied to the seat and the standard value Ws of the load applied to the seat (for example, the seating load change ratio β described above) may serve as a proxy variable representing the body height. Then, the larger the difference between the local maximum Wn of the load applied to the seat and the standard value Ws of the load applied to the seat is, the stricter the determination condition for the detection of the deviation of the seating state is made.

Figure 17:
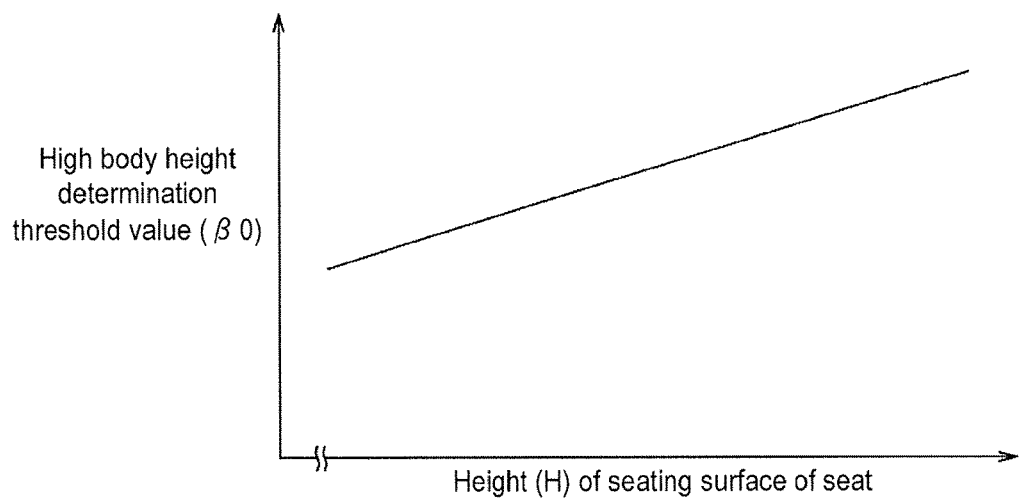
FIG. 17 is an explanation view showing a manner of tightening a determination condition of a high body height determination on the basis of a height of a seating surface of the seat.

Further, in a case where a height H from the floor portion F to the seating surface 2s of the seat 1 is detectable, it may be configured such that the lower the height H of the seating surface 2s is, the stricter a determination condition for estimating that the occupant 30 has a tall body height is made as shown in FIG. 17. For example, in the example shown in FIG. 17, a relationship between the threshold value β0 used for estimating whether the body height of the occupant 30 is tall or short (refer to FIG. 9. Step 504), and the height H of the seating surface 2s of the seat 1 is held or stored in a form of a map. A configuration that detects the height H of the seating surface 2s may include any configuration. For example, in a case where the seat is provided with an electric lifter apparatus, an amount of lifting may be counted. According to the above-described configuration, the lower the height H of the seating surface 2s is, the stricter value, that is, the smaller value, is set as the threshold value β0.

That is, in a case where the height H of the seating surface 2s of the seat 1 is low, the difference between the local maximum Wn of the load applied to the seat which is detected when the occupant 30 is getting seated onto the seat 1 and the standard value Ws of the load applied to the seat in a state where the occupant 30 is seated at the seat tends to be large, even when the body height of the occupant 30 is low. However, by applying the above-described configuration, the threshold value β0 is optimized in accordance with the height H of the seating surface 2s. Accordingly, it can be detected more accurately that the occupant 30 seated at the seat 1 has a tall body height.

In other words, in a case where the height H of the seating surface 2s of the seat 1 is high, the difference between the local maximum Wn of the load applied to the seat which is detected when the occupant 30 is getting seated onto the seat 1 and the standard value Ws of the load applied to the seat in a state where the occupant 30 is seated at the seat tends to be small. Accordingly, it is easily determined that the occupant 30 does not have a tall body height. Therefore, an effect of tightening the determination condition, which is based on the difference between the local maximum Wn of the load applied to the seat and the standard value Ws of the load applied to the seat, may be decreased.

According to the above-described configuration, however, the higher the height H of the seating surface 2s is, the more lenient threshold value β0 is set, that is, the larger threshold value β0 is set. That is, it becomes more likely that the occupant 30 has a tall body height, and accordingly the determination condition for detecting the deviation of the seating state can be made stricter. Consequently, it can be detected more accurately that the occupant 30 is in the deviated seating state.

Figure 18:
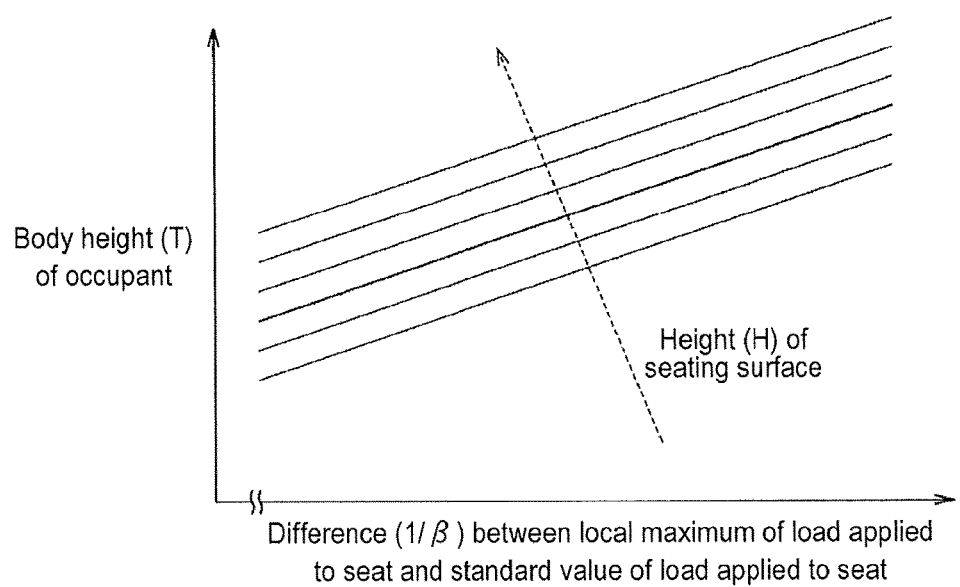
FIG. 18 is an explanation view showing a manner of estimating the body height of the occupant on the basis of the difference between the local maximum of the load applied to the seat and the standard value of the load applied to the seat (the reciprocal of the seating load change ratio), and on the basis of the height of the seating surface of the seat.

Further, in a configuration in which the body height of the occupant 30 can be estimated continually or in a multi-step manner, it may be configured such that the higher the height H of the seating surface 2s of the seat 1 is, the taller the body height T is estimated as shown in FIG. 18. Accordingly, the body height of the occupant 30 is estimated more accurately.

Figure 19:
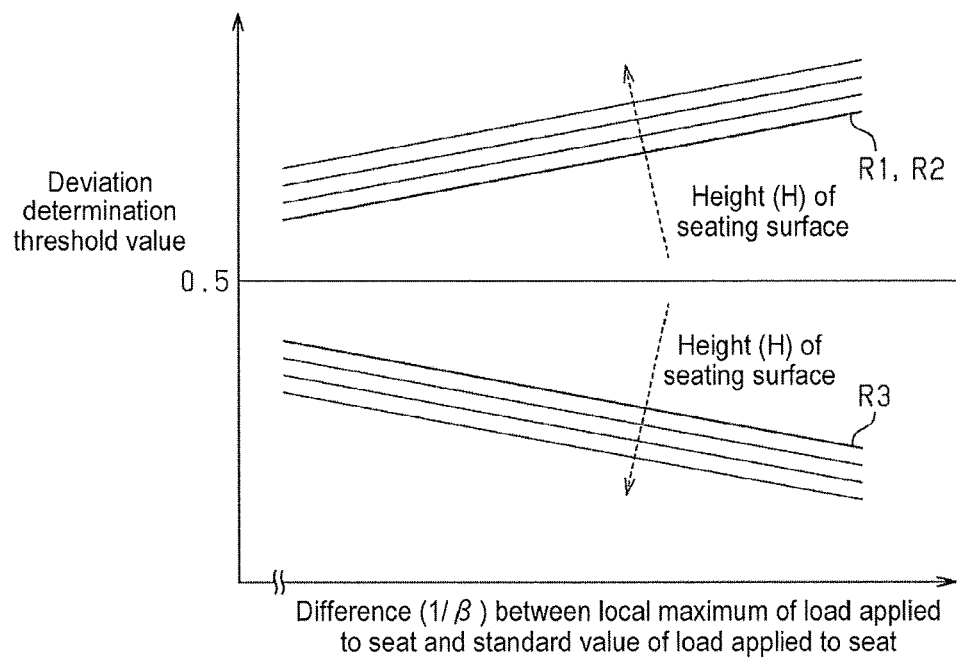
FIG. 19 is an explanation view showing a manner of tightening the determination condition of the deviation detection of the seating state on the basis of the difference between the local maximum of the load applied to the seat and the standard value of the load applied to the seat (the reciprocal of the seating load change ratio), and on the basis of the height of the seating surface of the seat.

In addition, as shown in FIG. 19, on the basis of the height H of the seating surface 2s of the seat 1, the determination condition for detecting the deviation of the seating state may be made strict. That is, the higher the height H of the seating surface 2s is, the stricter the determination condition is made. Accordingly, it can be detected with more accuracy that the occupant 30 at the seat 1 is in the seating state which is deviated.

In the aforementioned embodiment, in a case where the occupant 30 is estimated to have a tall body height, the determination condition for detecting the deviation of the seating state of the occupant 30 is made strict. However, the result of the estimation of the body height of the occupant 30 may be used for other determination processing and control content.

Next, technical ideas which can be grasped from the aforementioned embodiment and effects thereof will be described. (A) The occupant detection method includes detecting the height of the seating surface of the seat, wherein when the body height of the occupant is estimated, the higher the height of the seating surface is, the taller body height of the occupant is estimated.

(B) The occupant detection apparatus includes a seating height detection portion detecting the height of the seating surface of the seat, wherein the higher the height of the seating surface is, the taller body height of the occupant is estimated by the body height estimation portion.

According to the above-described configurations, the body height or body length of the occupant 30 can be estimated more accurately. (C) The occupant detection apparatus includes the seating height detection portion detecting the height of the seating surface of the seat, and a third determination condition change portion making the determination condition for detecting the deviation of the seating state strict in such a manner that the higher the height of the seating surface is, the stricter the determination condition is made.

(D) The occupant detection apparatus, wherein, in a case where the detection value of the load applied to the seat is stable after the seating of the occupant is detected, the load standard value setting portion holds the detection value as the standard value of the load applied to the seat.

(E) The occupant detection apparatus, wherein, in a case where the load applied to the seat does not include the deviation, the load standard value setting portion holds the detection value of the load applied to the seat as the standard value of the load applied to the seat. (F) The occupant detection method, wherein tightening the determination condition for detecting the deviation of the seating state includes estimating the body height of the occupant on the basis of the difference between the local maximum of the load applied to the seat and the standard value of the load applied to the seat, and tightening the determination condition stricter in such a manner that the taller the estimated body height is, the stricter the determination condition is made.

According to the above-described configurations, the detection of the seating state of the occupant can be performed more accurately. (G) The occupant detection method, wherein estimating the body height of the occupant includes detecting the height of the seating surface of the seat, and tightening the determination condition for estimating the body height of the occupant in such a manner that the lower the seating surface of the seat is, the stricter the determination condition is made.

According to the above-described configuration, the most appropriate determination condition can be set in accordance with the height of the seating surface of the seat. Consequently, the body height of the occupant can be estimated more accurately.

(H) The load applied to the seat is detected by the load sensor provided at the bottom side or the reverse side of the seat facing that forms the seating surface of the seat. (I) The load applied to the seat is detected by the load sensor interposed between the seat and the support member of the seat.

According to the aforementioned embodiment, the occupant detection method includes detecting the load applied to the seat 1 for the vehicle, detecting that the occupant 30 is seated at the seat 1, holding the local maximum Wn of the load which is detected when the occupant 30 becomes seated, setting the standard value Ws of the load in a state in which the occupant 30 is seated at the seat 1, and estimating the body height of the occupant 30 on the basis of the comparison between the local maximum Wn of the load and the standard value Ws of the load, wherein when estimating the body height of the occupant 30, the larger the difference between the local maximum Wn of the load and the standard value Ws of the load is, the higher body height of the occupant 30 is estimated.

According to the above-described configuration, during the seating of the occupant 30 onto the seat 1, the detection value Wx of the load applied to the seat is increased when the occupant 30 places his or her buttocks down onto the seat cushion 2. The largest value, that is, the local maximum (the peak value) Wn, in the process of increment in the load applied to the seat is detected when the occupant 30 places his or her weight on the seat 1. Thereafter, as the occupant 30 lowers his or her feet on the floor portion F of the vehicle and thus part of the weight of the occupant 30 is supported, the detection value Wx of the load applied to the seat becomes stable at the value smaller than the local maximum Wn that is the local maximum during the seating of the occupant 30 onto the seat 1. The amount of changes of the load applied to the seat, that is, the decrement of the load from the local maximum Wn, tends to be large as the body height of the occupant 30 is tall. That is, the taller or higher the body height of the occupant 30 is, the larger the amount of the change of the load applied to the seat tends to be.

That is, generally, the taller a person is, the longer his or her legs are. Thus, the higher the body height of the occupant 30 is, the higher the rate is at which the occupant 30 supports the weight with his or her own feet placed down on the floor portion F of the vehicle. As a result, the amount of the change in the load decreasing from the local maximum Wn is large, that is, the difference between the local maximum Wn of the load applied to the seat and the standard value Ws of the load applied to the seat in a state where the occupant 30 is seated at the seat is also large. Consequently, according to the above-described configuration, the body height of the occupant 30 can be estimated accurately on the basis of the load applied to the seat which is detected at the seating of the occupant 30.

According to the above-described configuration, the deviation of the seating state can be detected with more accuracy.

According to the aforementioned embodiment, the occupant detection method further includes detecting the height H of the seating surface 2s of the seat 1, wherein when estimating the body height of the occupant 30, the higher the height H of the seating surface 2s is, the taller body height of the occupant 30 is estimated.

According to the aforementioned embodiment, when estimating the body height of the occupant 30, the height of the seating surface of the seat 1 is detected, and the lower the height H of the seating surface 2s is, the stricter the determination condition for estimating the body height of the occupant 30 is made.

According to the aforementioned embodiment, when setting the standard value Ws of the load applied to the seat, in a case where the detection value Wx of the load applied to the seat 1 is stable after the seating of the occupant 30 is detected, the detection value Wx is held as the standard value Ws of the load applied to the seat.

That is, in many cases, while the occupant 30 is getting seated, the occupant 30 once comes to be in the appropriate seating state which is not deviated. By setting this stable detection value Wx of the load applied to the seat, the detection value Wx which is stabilized in the above-described state, as the standard value Ws of the load applied to the seat, it can be detected more accurately that the occupant 30 at the seat 1 is in the deviated seating state.

According to the aforementioned embodiment, the occupant detection method includes detecting the load applied to the seat 1 for a vehicle, detecting that the occupant 30 is seated at the seat 1, holding the local maximum Wn of the load which is detected when the occupant 30 becomes seated, setting the standard value Ws of the load in a state in which the occupant 30 is seated at the seat 1, detecting the deviation of the seating state of the occupant 30 at the seat 1 by monitoring the deviation of the load, and making the determination condition for detecting the deviation of the seating state strict in such a manner that the larger the difference between the local maximum Wn of the load and the standard value Ws of the load is, the stricter the determination condition is made.

That is, in a case where the body height of the occupant 30 seated at the seat 1 is tall or high, the gravity center of the occupant 30 is shifted significantly by the inclination of the seating posture of the occupant 30. Accordingly, the deviation of the load applied to the seat tends to become obvious. Consequently, it is more likely that the seating state is judged to include the deviation even in a case where the inclination of the seating posture and/or the displacement of a seating position are smaller.

However, in a case where the body height of the occupant 30 seated at the seat 1 is high, the difference between the standard value Ws of the load applied to the seat and the local maximum Wn of the load applied to the seat is large. Consequently, according to the above-described configuration, when detecting the deviation of the seating state, the most appropriate determination condition depending on the body height of the occupant 30 which is estimated from the difference between the local maximum Wn of the load applied to the seat and the standard value Ws of the load applied to the seat is set. Thus, it is detected more accurately that the occupant 30 at the seat 1 is in the deviated seating state.

According to the aforementioned embodiment, the occupant detection method further includes making the determination condition for detecting the deviation of the seating state strict in such a manner that the larger the standard value Ws of the load is, the stricter the determination condition is made. That is, in a case where the weight of the occupant 30 is heavy, the deviation of the load applied to the seat becomes obvious easily. The larger the standard value Ws of the load applied to the seat which is set is, the heavier the weight is estimated to be, if the body height is the same. Consequently, according to the above-described configuration, it is detected more accurately that the occupant 30 at the seat 1 is in the deviated seating state.

According to the aforementioned embodiment, the occupant detection method further includes detecting the height H of the seating surface 2s of the seat 1, and making the determination condition for detecting the deviation of the seating state strict in such a manner that the higher the height H of the seating surface 2s is, the stricter the determination condition is made.

That is, in a case where the height H of the seating surface 2s of the seat 1 is high, the difference between the local maximum Wn of the load applied to the seat and the standard value Ws of the load applied to the seat tends to be small. Accordingly, the effect of tightening the determination condition, which is on the basis of the body height of the occupant 30 that is indicated by the difference between the local maximum Wn of the load and the standard value Ws of the load, may be decreased. However, according to the above-described configuration, the most appropriate determination condition in response to the height H of the seating surface 2s is set. Consequently, it can be detected more accurately that the occupant 30 at the seat 1 is in the deviated seating state.

According to the aforementioned embodiment, the occupant detection method further includes estimating the body height of the occupant 30 on the basis of the difference between the local maximum Wn of the load applied to the seat and the standard value Ws of the load applied to the seat, and making the determination condition for detecting the deviation of the seating state strict in such a manner that the higher the height of the occupant 30 is estimated, the stricter the determination condition is made.

According to the aforementioned embodiment, when setting the standard value Ws of the load applied to the seat, in a case where the detection value Wx of the load is stable after the seating of the occupant 30 is detected, the detection value Wx is held as the standard value Ws of the load.

That is, in many cases in which the occupant 30 is getting seated at the seat 1, the occupant 30 is once in the appropriate seating state without being deviated. By setting the stabilized detection value Wx of the load as the standard value Ws of the load applied to the seat, it can be detected more accurately that the occupant 30 at the seat 1 is in the deviated seating state.

According to the aforementioned embodiment, when setting the standard value Ws of the load applied to the seat, the detection value Wx of the load is held as the standard value Ws of the load if the load does not include the deviation.

According to the above-described configuration, it is detected more accurately that the occupant 30 at the seat 1 is in the seating state which is deviated.

According to the aforementioned embodiment, the occupant detection apparatus includes the load detection portion 20 detecting the load applied to the seat 1 for the vehicle, the seating detection portion 20 detecting that the occupant 30 is seated at the seat 1, the local maximum holding portion 20 holding the local maximum Wn of the load which is detected when the occupant 30 becomes seated, the standard value setting portion 20 setting the standard value Ws of the load in a state in which the occupant 30 is seated at the seat 1, and the body height estimation portion 20 estimating the body height of the occupant 30 on the basis of the comparison between the local maximum Wn of the load and the standard value Ws of the load, wherein the larger the difference between the local maximum Wn of the load and the standard value Ws of the load is, the higher body height of the occupant 30 is estimated by the body height estimation portion 20.

According to the aforementioned embodiment, the occupant detection apparatus includes the load detection portion 20 detecting the load applied to the seat 1 for the vehicle, the seating detection portion 20 detecting that the occupant 30 is seated at the seat 1, the local maximum holding portion 20 holding the local maximum Wn of the load which is detected when the occupant 30 becomes seated, the standard value setting portion 20 setting the standard value Ws of the load in a state in which the occupant 30 is seated at the seat 1, the seating state deviation detection portion 20 detecting the deviation of the seating state of the occupant 30 at the seat 1 by monitoring the deviation of the load, and the determination condition change portion 20 making the determination condition for detecting the deviation of the seating state strict in such a manner that the larger the difference between the local maximum Wn of the load and the standard value Ws of the load is, the stricter the determination condition is made.

According to the aforementioned embodiment, the occupant detection apparatus includes the second determination condition change portion 20 making the determination condition for detecting the deviation of the seating state strict in such a manner that the larger the standard value Ws of the load is, the stricter the determination condition is made.

According to the aforementioned embodiment, the occupant detection apparatus includes the seating height detection portion 20 detecting the height H of the seating surface 2s of the seat 1, and the third determination condition change portion 20 making the determination condition for detecting the deviation of the seating state strict in such a manner that the higher the height H of the seating surface 2s is, the stricter the determination condition is made.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An occupant detection method comprising:
    detecting a load applied to a seat for a vehicle;
    detecting that an occupant is seated at the seat;
    holding a local maximum of the load which is detected when the occupant becomes seated;
    setting a standard value of the load in a state in which the occupant is seated at the seat; and
    estimating a body height of the occupant on the basis of a comparison between the local maximum of the load and the standard value of the load, wherein
    when estimating the body height of the occupant, the larger a difference between the local maximum of the load and the standard value of the load is, the higher body height of the occupant is estimated.

2. The occupant detection method according to claim 1, further comprising:
    detecting a height of a seating surface of the seat, wherein
    when estimating the body height of the occupant, the higher the height of the seating surface is, the higher body height of the occupant is estimated.

3. The occupant detection method according to claim 1, wherein when estimating the body height of the occupant,
    a height of a seating surface of the seat is detected, and
    the lower the height of the seating surface is, the stricter a determination condition for estimating the body height of the occupant is made.

4. The occupant detection method according to claim 1, wherein when setting the standard value of the load, in a case where a detection value of the load applied to the seat is stable after the seating of the occupant is detected, the detection value is held as the standard value of the load.

5. An occupant detection method comprising:
    detecting a load applied to a seat for a vehicle;
    detecting that an occupant is seated at the seat;

holding a local maximum of the load which is detected when the occupant becomes seated;

setting a standard value of the load in a state in which the occupant is seated at the seat;

detecting a deviation of a seating state of the occupant at the seat by monitoring a deviation of the load; and making a determination condition for detecting the deviation of the seating state strict in such a manner that the larger a difference between the local maximum of the load and the standard value of the load is, the stricter the determination condition is made.

6. The occupant detection method according to claim 5, further comprising:

making the determination condition for detecting the deviation of the seating state strict in such a manner that the larger the standard value of the load is, the stricter the determination condition is made.

7. The occupant detection method according to claim 5, further comprising:

detecting a height of a seating surface of the seat, and making the determination condition for detecting the deviation of the seating state strict in such a manner that the higher the height of the seating surface is, the stricter the determination condition is made.

8. The occupant detection method according to claim 5, further comprising:

estimating a body height of the occupant on the basis of the difference between the local maximum of the load and the standard value of the load, and making the determination condition for detecting the deviation of the seating state strict in such a manner that the higher the height of the occupant is estimated, the stricter the determination condition is made.

9. The occupant detection method according to claim 5, wherein when setting the standard value of the load, in a case where a detection value of the load is stable after the seating of the occupant is detected, the detection value is held as the standard value of the load.

10. The occupant detection method according to claim 6, wherein when setting the standard value of the load, in a case where the load does not include the deviation, a detection value of the load is held as the standard value of the load.

11. An occupant detection apparatus comprising:

a load detection portion detecting a load applied to a seat for a vehicle;

a seating detection portion detecting that an occupant is seated at the seat;

a local maximum holding portion holding a local maximum of the load which is detected when the occupant becomes seated;

a standard value setting portion setting a standard value of the load in a state in which the occupant is seated at the seat;

a seating state deviation detection portion detecting a deviation of a seating state of the occupant at the seat by monitoring a deviation of the load; and a determination condition change portion making a determination condition for detecting the deviation of the seating state strict in such a manner that the larger a difference between the local maximum of the load and the standard value of the load is, the stricter the determination condition is made.

12. The occupant detection apparatus according to claim 11, comprising:

a second determination condition change portion making the determination condition for detecting the deviation of the seating state strict in such a manner that the larger the standard value of the load is, the stricter the determination condition is made.

13. The occupant detection apparatus according to claim 11, comprising:

a seating height detection portion detecting a height of a seating surface of the seat, and a third determination condition change portion making the determination condition for detecting the deviation of the seating state strict in such a manner that the higher the height of the seating surface is, the stricter the determination condition is made.

* * * * *